United States Patent Office 3,482,001
Patented Dec. 2, 1969

3,482,001
DIMERIZATION OF PROPYLENE TO DIMETHYLBUTENES
Gert G. Eberhardt, Philadelphia, Pa., assignor to Sun Oil Company, Philadelphia, Pa., a corporation of New Jersey
No Drawing. Continuation-in-part of application Ser. No. 551,953, May 23, 1966. This application Oct. 16, 1967, Ser. No. 675,280
Int. Cl. C07c *3/18*
U.S. Cl. 260—683.15                 16 Claims

ABSTRACT OF THE DISCLOSURE

Monoolefins are dimerized by contact at a temperature in the range of −100° C. to 200° C., preferably −50° to 100° C., with novel catalyst systems formed by combining (1) certain types of nickel (II) or cobalt (II) halide phosphine coordination complexes, e.g., $(R_3P)_2NiCl_2$, with (2) a Lewis acid which is a hydrocarbyl aluminum dichloride, dibromide, sesquichloride, sesquibromide, monochloride or monobromide. The proportions of the catalyst components are such that the atomic ratio of Al:Ni or Al:Co is in excess of 2:1, and the catalysts are used in solution in a suitable liquid medium, e.g. chlorobenzene.

---

This application is a continuation-in-part of application Ser. No. 551,953, filed May 23, 1966, now abandoned.

This invention relates to novel catalyst compositions and to their use in the dimerization and/or codimerization of olefinic hydrocarbons.

The catalysts of the invention are combinations of (1) certain types of coordination complexes of nickel or cobalt halides and phosphines with (2) certain types of Lewis acids, as hereinafter specified. They have particular utility in dimerizing and codimerizing mono-olefinic hydrocarbons, e.g., in converting propylene into hexenes. These catalysts are normally used in solution in a non-polar solvent so that the catalyst system is homogeneous, and they are effective at room temperature or at temperatures considerably below and above room temperature, e.g., from −100° C. to 200° C.

In the prior art it has been disclosed (Dutch patent application 6,409,179, filed Aug. 10, 1964; Wilke, Angew. Chem., vol. 78, No. 3, 1966, pp. 170–171) that catalysts capable of dimerizing propylene can be made utilizing π-allyl metal halides complexed with a phosphine such as triphenylphosphine or tri-cyclohexylphosphine. These π-allyl metal halide phosphine complexes can, for example, be represented by the following formula:

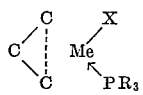

wherein Me is nickel (II) or cobalt (II) and X is chlorine, bromine or iodine. The use of these complexes in combination with a Lewis acid, such as ethyl aluminum dichloride or aluminum bromide, to catalyze the dimerization of propylene at low temperatures is disclosed. It was shown that such catalysts are selective in the manner in which they cause dimerization to occur and that the structure of the dimer product will depend largely on the particular R group in the phosphine component of the catalyst.

By way of example of such prior art, when the π-allyl complex was made by combining π-allyl nickel iodide with triphenylphosphine and the resulting complex was used in combination with ethyl aluminum dichloride, dimerization occurred mainly in the following manner:

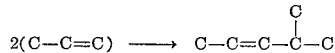

Thus 2-methylpentene mainly results when the phosphine contains R groups, such as phenyl, which impart to the phosphine component a relatively electron-accepting character.

On the other hand, when π-allyl nickel iodide was combined with tricyclohexylphosphine and the resulting complex was used together with ethyl aluminum dichloride, the dimerization proceeded mainly as follows:

Thus 2,3-dimethylbutene is the main product when the phosphine component contains R groups, such as cyclohexyl, that give the phosphine an electron-donating character.

The foregoing prior art catalysts made from π-allyl metal coordination compounds have several drawbacks which detract from their usefulness in practical applications. In the first place the π-allyl metal complexes are difficult to prepare. Complexes of this kind are highly reactive with air and moisture, and they are unstable to light. Furthermore, the activity of the catalyst made by combining these complexes with a Lewis acid tends to decline rapidly even when these catalysts are used at room temperature, and hence it is necessary to use sub-zero temperatures, such as −10° C. to −80° C., when they are employed for dimerizing olefins.

The present invention provides improved catalyst systems which avoid the foregoing disadvantages of the prior art catalysts. The present catalysts are more easily prepared and are made from metal complexes which are considerably more stable with respect to air, moisture, light and elevated temperatures than the π-allyl metal complexes. In using the present catalysts low temperatures are not required in order to avoid rapid catalyst deactivation, and the dimerization reaction can readily be carried out at room temperature at high rates to obtain high yields of product per unit weight of catalyst.

The catalyst systems provided by the present invention are a combination of a different type of metal halide phosphine coordination complex with certain specific kinds of Lewis acids. The metal of the coordination complex can be either nickel(II) or cobalt(II), and the complex can correspond to any of the following formulas:

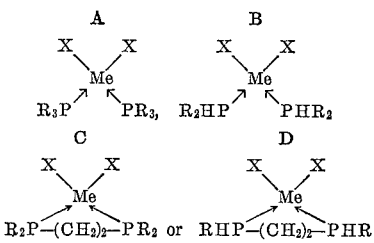

wherein Me is nickel(II) or cobalt(II) and X is chlorine, bromine or iodine. It should be noted that Me includes only nickel(II) and cobalt(II), since other metals (e.g., iron, platinum, palladium) while being capable of forming analogous coordination complexes do not give useful catalysts for the present purpose. The best catalysts are obtained when Me is nickel. R in all of these formulas represents any hydrocarbyl radical having 1–30 carbon atoms selected from the group consisting of alkyl, cycloalkyl, alkenyl, cycloalkenyl, aryl, aralkyl and aralkenyl. While the R groups can have an important influence on the structure of the dimer product depending on the type of R group present in the coordination complex and also can have an influence with respect to degree of solubility of the resulting catalyst, any R group (or groups) as above specified is (or are) operative for preparing catalyst systems in accordance with the invention. The R groups in the coordination complex employed can be the same or different hydrocarbyl radicals. Of the four types of coordination complexes shown Type A generally is preferred.

The Lewis acids with which the foregoing coordination complexes are combined to give the present catalyst systems are hydrocarbyl aluminum dihalides, hydrocarbyl aluminum sesquihalides and dihydrocarbyl aluminum halides, wherein the halogen is chlorine or bromine. In other words the Lewis acids are of the group R'AlX$_2$', R$_3$'Al$_2$X$_3$' and R$_2$'AlX', wherein X is chlorine or bromine and the R' radicals again are any hydrocarbyl radicals having 1-30 carbon atoms selected from the same group as specified above for R. Other Lewis acids such as R$_3$Al, AlCl$_3$, AlBr$_3$ and BF$_3$ are not useful for making the present type of catalyst and cannot be substituted for those here specified.

The present catalysts can be used for converting monoolefins to oligomers which are mainly dimers of the starting olefins. Any such olefins, whether being terminal or internal olefins, can be made to dimerize and/or codimerize by means of these catalysts, provided that the olefins has its double bond between two carbon atoms neither of which is attached to more than one carbon atom. This applies to straight chain and branched aliphatic olefins as well as to cyclic olefins. In other words the present catalysts can be employed for converting to oligomers (mainly to dimers) any monoolefin in which the double bond is between carbon atoms that have no side substituent such as a methyl group or higher side chain. The catalysts are particularly useful for effecting the dimerization or codimerization of C$_2$-C$_{10}$ aliphatic monoolefins, such as the following: ethylene; propylene; butene-1; butene-2; pentene-1; pentene-2; pentene-3; 4-methyl-pentene-1; 3,3-dimethylbutene-1; 3,4-dimethylpentene-1; octene-1; 2,5-dimethylhexene-3; 4-ethylhexene-2; nonenes; etc. Examples of other olefins that can be made to dimerize by means of the present catalysts are dodecenes; cetenes; eicosenes; docosenes; cyclopentene; cyclohexene; methylcyclohexenes; dimethylcyclohexenes; and cyclooctene; in all of which olefins the carbon atoms forming the double bond have no side substituents. When two or more olefins are present in the charge, codimerization will occur as well as dimerization. Hence, when the term "dimerization" is used herein, it is intended to include codimerization as well if the olefinic charge material contains more than one olefin component.

The present catalysts when contacted with conjugated diolefins, such as butadiene or isoprene, or with styrene or alpha-methylstyrene will, instead of effecting dimerization, cause polymerization to occur to yield high molecular weight rubbery or hard polymers. Non-conjugated diolefins when contacted with the catalyst tend to isomerize into conjugation and likewise then polymerize to high polymers.

The dimerization reaction can be carried out by contacting a monoolefin as above specified or a mixture of such olefins with a solution of the catalyst at a temperature in the range of −100° C. to 200°C., more preferably −50° C. to 100° C. The rate of dimerization at any selected reaction temperature will depend upon the particular olefinic charge employed, and will vary inversely with the molecular weight of the starting olefin. The rate also will depend upon the accessibility of the double bond for contact with the catalyst species. The reaction preferably is carried out employing a solvent which has some degree of polarity, although it can also be effected in many cases without such solvent by utilizing excess olefin charge material as solvent. Suitable solvents are described in more detail hereinafter. When a solvent is not employed and an excess of olefin is used instead as solvent, the R groups in the phosphine component of the catalyst should contain sufficient carbon atoms to impart to the metal coordination compound substantial solubility in the olefin employed.

The reaction product obtained is preponderantly the dimer and/or codimer, or in other words is product resulting from the combination of two molecules of charge olefin per molecule of product. However, minor amounts of higher molecular weight olefins usually are also obtained, perhaps due to interaction of dimer or codimer product with additional charge material or with itself. As a general rule the amount of these higher boiling products can be held to less than 20% by weight of the total olefin reacted by maintaining a relatively high concentration of monomer in the reaction mixture.

The manner in which two molecules of the starting olefin combine to yield the dimer will depend upon the particular R groups in the phosphine component of the catalyst system, just as in the case of the prior art π-allyl catalysts discussed above. For example, when propylene is the charge olefin, R groups in the phosphine that impart thereto relatively high electron-accepting character, such as phenyl, tolyl or naphthyl, tend to result in methylpentenes as the predominant product structure. On the other hand, R groups which impart an electron-donating character to the phophine component, such as isopropyl, t-butyl or cyclopentyl, tend to cause 2,3-dimethylbutenes to be the mian product. Hence the invention allows different specific dimers to be obtained as the major product by appropriate selection of the R groups for the phosphine. As a rough indication of the effect of various types of R groups in the phosphine, the following is a listing of R group types in the order generally exhibited for decreasing electron-accepting ability: aryl; aralkenyl; aralkyl; alkenyl; cycloalkenyl; saturated hydrocarbon groups (alkyl or cycloalkyl) attached to the phosphorous atom through a primary carbon atom; and saturated hydrocarbon groups attached to the phosphorous atom through a secondary or tertiary carbon atom. However, this order is subject to variation depending upon the specific hydrocarbon groups involved. For instance, an aralkyl group in which the alkyl moiety is long or an alkenyl group where the double bond is remote from the carbon atom attached to the phosphorous atom can cause the catalyst to function in substantially the same way as if it were prepared from a phosphine in which the R group is alkyl.

The present catalyst, in addition to effecting dimerization, can also cause isomerization of the double bond in the olefinic product and to some extent in the starting olefin. Hence the position of the double bond in the dimer product will depend upon the specific conditions under which the reaction is carried out and particularly the length of time at which the dimer is allowed to remain in contact with the catalyst system. For example, when propylene is dimerized using a catalyst in which the phosphine is triphenylphosphine, the main dimer initially formed is 4-methylpentene-2; but if this is allowed to remain in contact with the catalyst for substantial time, it tends to isomerize to other methylpentenes. When tricyclohexylphosphine is used instead, the main initial dimer is 2,3-dimethylbutene-1, especially when the reaction temperature is relatively low (e.g., −50° to 25° C.); but continued contact of this product with the catalyst tends to cause isomerization to 2,3-dimethylbutene-2. Prolonged contact of the product with the catalyst system after the charge olefin has been consumed can also cause part of the product to dimerize and yield products of still higher molecular weight.

When the desired product from propylene dimerization is 2,3-dimethylbutene, it is best that all R groups in the coordination complex used to form the catalyst be saturated hydrocarbon groups attached to the phosphorous through a secondary or tertiary carbon atom. Also the reaction temperature for producing this particular dimer should be below 25° C., e.g., 0° C. or lower, since the selectivity for its production from propylene improves as the temperature decreases.

As previously indicated, a solvent preferably is employed in carrying out the present process. The solvent must be capable of dissolving the catalyst and must be liquid at the temperature and pressure conditions employed. The solvent preferably has some polarity; however, solvents which have high dipole moments, such as water, alcohols, ketones, esters, amines, dioxane and tetrahydrofuran, will irreversibly coordinate with the nickel or cobalt and deactivate the catalyst. The best solvents are halogenated aliphatic and aromatic compounds in which the halogen is chlorine, bromine, fluorine or combinations of such substituents. These have good solvency for the catalyst components. Instead of the halogenated solvents, liquid aromatic hydrocarbons can also be employed as solvents but they are less desirable than the halogenated hydrocarbon solvents since the resulting catalyst systems tend to have lower activities.

Halohydrocarbons that are particularly suitable as the solvent medium are halobenzenes having 1-2 halogen atoms, trihaloethanes, tetrahaloethanes, trihaloethylenes and tetrahaloethylenes, in which halohydrocarbons the halogen can be chlorine, bromine or fluorine or combinations of such substituents. Particularly suitable solvents are the monohalobenzenes, viz., chlorobenzene, bromobenzene and fluorobenzene, and dihalobenzenes which are liquid at the reaction temperature such as ortho- and meta-dichlorobenzenes, dibromobenzenes or difluorobenzenes. Examples of other halohydrocarbons that can be used are: methyl chloroform; methyl bromoform; 1,1,2-trichloroethane; 1,1,2,2 - tetrachloroethane; trifluoroethanes; tribromoethanes; chlorodifluoroethanes; trichlorotrifluoroethanes; tetrafluoroethanes; and similar ethylene derivatives containing 2-4 halogen atoms which are chlorine, bromine and/or fluorine. Many other halogenated hydrocarbon solvents can also be used.

In formulating the catalyst system preparatory to carrying out the dimerization reaction, a nickel or cobalt coordination complex of types A, B, C or D as above specified is first prepared. Such metal halide phosphine complexes are known and are described in "Advances in Inorganic and Radiochemistry," vol. 6, pp. 19–21 and 27–31, Academic Press (1964). They can be made by dissolving the chloride, bromide or iodide of nickel(II) or cobalt(II) in an alcohol and adding a stoichiometric amount of the phosphine. The coordination complex forms readily and precipitates, and it is recovered by filtering the mixture and drying the residue. For the present purpose it is distinctly preferable to use either the chloride or bromide of nickel(II) to make the complex.

The following are some specific illustrations of coordination complexes prepared in this manner, in which R is phenyl, Me is nickel and X is chlorine:

Type A: $NiCl_2 + 2(triphenylphosphine) \rightarrow$
    bis(triphenylphosphine)nickel chloride
Type B: $NiCl_2 + 2(diphenylphosphine) \rightarrow$
    bis(diphenylphosphine)nickel chloride
Type C: $NiCl_2 + 1,2$-bis(diphenylphosphine)ethane $\rightarrow$
    1,2-bis(diphenylphosphine)ethane nickel chloride
Type D: $NiCl_2 + 1,2$-bis(phenylphosphine)ethane $\rightarrow$
    1,2-bis(phenylphosphine)ethane nickel chloride The bis-phosphines used in preparing the complexes of types C and D are chelating phosphines and the resulting chelate complexes likewise are known compounds as can be seen from the reference referred to above.

The so-prepared coordination complex is dissolved in a solvent which preferably is a halohydrocarbon as described above, and the Lewis acid, which as previously stated is $R'AlX_2'$, $R_3'Al_2X_3'$ or $R_2'AlX'$ and preferably is the sesquihalide, is added in a proportion such that in excess of two atoms of aluminum are provided per atom of nickel or cobalt in the coordination complex. Preferably the proportion of Lewis acid to the complex is well in excess of this proportion. While it is not known with certainty, it is believed that the resulting catalyst is a species formed by the combination of one mole of the coordination complex with at least two moles of the Lewis acid (i.e., the equivalent of at least two aluminum atoms per atom of nickel or cobalt). The use of the Lewis acid in less than this 2:1 molar ratio is substantially inoperative. It is distinctly preferable to employ a large excess of the Lewis acid such that the atomic ratio of Al:Me is in the range of 10:1 to 100:1, and the most desirable ratio generally is of the order 20–30:1. The excess Lewis acid over the 2:1 ratio of Al:Me acts as a scavenger for impurities, such as moisture and oxygen, which may be present, and also this excess develops the active catalyst species more completely. A large excess of the Lewis acid also is particularly important when an iodide of nickel or cobalt has been used to prepare the coordination complex (i.e., where X is iodine), as development of the active catalyst depends upon chlorine or bromine being interchanged with iodine upon addition of the Lewis acid. A large excess of the Lewis acid aids this interchange.

When the metal halide phosphine complex and the Lewis acid are mixed, a distinct color change occurs. This color change seems to be indicative of the formation of the desired catalyst species. For example, the nickel chloride or bromide complexes generally give solutions which are green when the phosphine has high electron-accepting character (e.g., R=phenyl) or which are otherwise red (e.g., R=alkyl or cycloalkyl), and the color of these solutions changes to amber-yellow upon addition of the specified Lewis acids. The cobalt complexes usually give a blue solution and the color turns to greenish-yellow when the Lewis acid is added. These distinct color changes are useful in indicating that the desired catalyst has been formed. In contrast, when a Lewis acid of a type not within the scope of the invention is tried, for example, $BF_3$, such color change does not usually occur when it is added to the metal complex solution.

When a highly polar material, e.g., water, is mixed with the catalyst solution, it reacts and causes deactivation of the catalyst. This procedure can be employed, if desired, to deactivate the catalyst after the olefin dimerization reaction has been completed.

Application of the catalyst, prepared as above-described, for dimerizing olefins, can be effected merely by contacting the colored catalyst solution with the olefin at any temperature in the range of —100 C. to 200° C. which provides a suitable rate of reaction. As previously stated, any monoolefin which has no side substituents at the carbon atoms which form the double bond can be made to dimerize by means of these catalysts. Suitable temperatures of reaction will depend upon the reactivity of the particular monomer being charged. The reaction occurs in solution. Hence, when the starting olefin would otherwise be gaseous at the reaction temperature selected, sufficient pressure should be used to give it substantial solubility in the catalyst solution.

When the charge is one or more aliphatic olefins of the $C_2$–$C_{10}$ range, a temperature in the range of —50° to 100° C. generally is preferred, and for the $C_4$–$C_{10}$ olefins it is usually desirable to operate at temperatures below 25° C. since higher temperatures tend to cause the activity of the catalyst to decrease. With the lower olefins sufficient pressure and also adequate agitation are used so that the gaseous feed will rapidly dissolve in the solution so as to maintain an adequate concentration thereof as the reaction proceeds. The temperature level at which the reaction is carried out can have an effect on the structure of the product obtained. For example, in the dimerization of propylene low temperature favors the production of 2,3-dimethylbutene while high temperature favors the formation of methylpentene. Thus, when the desired product is 2,3-dimethylbutene, not only should R in the catalyst be an electron-donating group such as cyclohexyl or isopropyl but the temperature selected preferably should be in the range of −50° C. to 25° C. On the other hand, when the objective is to produce methylpentene, R should be an electron-accepting group such as phenyl or naphthyl and temperatures in the range of 25–100° C. are quite satisfactory, although methylpentenes are also the major product even at low temperatures when the R groups in the catalyst are of the latter type.

The dimerization reaction can be carried out batchwise or in continuous manner. In the latter case the catalyst solution can be circulated through a contact zone, such as a tank or column, to which the olefin as either a gas or liquid can be continuously or intermittently fed. The reaction zone is maintained at the desired reaction temperature by cooling or heating as required. A stream of catalyst solution containing the reaction product is withdrawn from the contact zone and is introduced into a distillation zone to strip out the reaction product including dimer and any higher boiling material that may have been formed. When operating in this manner a solvent should be selected with a sufficiently high boiling point so that the reaction product can readily be distilled therefrom, leaving as bottoms a solvent solution of the catalyst. This catalyst soluiton is recycled to the contact zone for reuse. If desired the overhead product can be cohobated to separately recover the dimer fraction from the higher boiling material.

When the olefin charge is contacted in gaseous form with the catalyst solution, as normally will be the case when a lower olefin is used such as ethylene, propylene or butenes, the reaction rate will depend not only on the temperature selected but also on the gas pressure, since the pressure will determine the concentration level of the gas dissolved in the solvent for contact with the catalyst. The pressure can be regulated to achieve the rate of dimerization desired. As previously mentioned, the catalyst also tends to cause isomerization of the double bond position in the dimer product. This reaction, however, is not related to pressure when the process is conducted at a temperature below the boiling point of the dimer. Hence, by carrying out the reaction at a relatively high pressure to effect dimerization at a rapid rate and then removing dimer from the solution soon after it has been formed, isomerization of the product can be minimized. This procedure is advantageous, for example, when it is desired to maximize production of 4-methylpentene-2 from propylene using triphenylphosphine as the $PR_3$ component or of 2,3-dimethylbutene-1 using tricyclohexylphosphine in the catalyst.

In order to specifically illustrate the invention a series of comparative runs was made to dimerize propylene utilizing chlorobenzene as the solvent (except in Run No. 6 where toluene was used). For these runs catalysts were made from either nickel or cobalt salts coordinated with various phosphines to give the coordination complexes listed in Table I. These coordination complexes were used in combination with either ethylaluminum sesquichloride ($Et_3Al_2Cl_3$), diethylaluminum chloride ($Et_2AlCl$) or ethylaluminum dichloride ($EtAlCl_2$) as indicated in Table II. In all runs other than Run No. 6 the proportion of the Lewis acid to the coordination complex was such that the Al:Me atomic ratio was 20:1.

More specifically, the runs (except Run No. 6) were carried out in the following manner. A 250 ml. flask provided with a magnetic agitator, means for cooling, temperatures indicating means, and means for applying and maintaining a regulated pressure of propylene in the flask was used. The flask first was charged with 60 ml. of a 0.0004 molar solution in chlorobenzene of the metal phosphine complex designated in Tables I and II, and nitrogen was bubbled through the solution for 10 minutes to effect deaeration. Propylene pressure of 100 mm. Hg above atmospheric pressure was next applied, and then while the mixture was being stirred at room temperature the Lewis acid was added in amount to provide an atomic ratio of Al:Me of 20:1. This caused an exotherm which generally brought the temperature to about 27° C., but the mixture was immediately cooled to the reaction temperature shown in Table II within about one minute. The reaction was continued for an additional 14 minutes and then was stopped by the addition of a small amount of aqueous alcohol to the flask in order to deactivate the catalyst. The amount of propylene consumed during the 15 minutes of total reaction time was measured and the corresponding average rate of reaction was calculated in each run, as shown in Table II. No major changes in reaction rates during the 15 minute reaction periods were noted. In other words catalyst activity throughout each run remained substantially unchanged. Run No. 6 was made in substantially the same manner except that 60 ml. of toluene was used as solvent and the Lewis acid ($Et_2AlCl$) was used in amount to give an Al:Ni ratio of 30:1.

The products from the runs were mainly dimers (i.e., hexenes) with a minor amount of $C_9$ olefin as shown in Table II. VPC analysis showed the composition of the $C_6$ portion in terms of the following sub-fractions: (1) methylpentenes; (2) 2,3-dimethylbutenes; and (3) n-hexenes. The runs listed in Table II can be grouped as follows:

Runs 1–5

These runs illustrate the use of ethylaluminum sesquichloride in combination with various nickel halide phosphine complexes in accordance with the invention.

Run 6

This illustrates the use of diethylaluminum chloride in combination with the same nickel complex as used in Run No. 4. Comparison of these two runs indicates that the sesquichloride gives a more highly active catalyst system.

Runs 7–10

These illustrate the use of ethylaluminum dichloride in combination with nickel complexes and also with cobalt complexes in accordance with the invention. Comparisons of Runs 6 and 7 with Runs 8 and 9 show that the nickel complexes give catalysts that are much more active than those obtained from the cobalt complexes. Also comparisons of Runs 6 and 7 with Runs 1 and 2, respectively, indicate that sesquichlorides give somewhat more active catalysts than do the alkylaluminum dichlorides.

Runs 11–12

These are two comparative runs made with metal coordination complexes used together with ethylaluminum dichloride as in Runs 7–10 but in which such complexes do not conform to those specified for the present invention. These complexes resulted in systems having no noticeable catalytic activity.

TABLE I

| Coordination Complex | Designation Used in Table II | Corresponding Run Nos. |
|---|---|---|
| Bis(tri-n-butylphosphine)nickel chloride | $(TBP)_2NiCl_2$ | 1 and 7 |
| Bis(tricyclohexylphosphine)nickel chloride | $(TCHP)_2NiCl_2$ | 2 and 8 |
| Bis(tricyclohexylphosphine)nickel bromide | $(TCHP)_2NiBr_2$ | 3 |
| Bis(triisopropylphosphine)nickel chloride | $(T i-PP)_2NiCl_2$ | 4 and 6 |
| 1,2-bis(diphenylphosphine)ethane nickel chloride | DPE $NiCl_2$ | 5 |
| Bis(tri-n-butylphosphine)cobalt chloride | $(TBP)_2CoCl_2$ | 9 |
| Bis(tricyclohexylphosphine)cobalt chloride | $(TCHP)_2CoCl_2$ | 10 |
| Bis(triisopropylphosphite)nickel chloride | $((RO)_3P)_2NiCl_2$ | 11 |
| Bis(triphenylphosphine)palladium chloride | $(TPP)_2PdCl_2$ | 12 |

TABLE II.—DIMERIZATION OF PROPYLENE

| | | | | | Composition of Product, wt. percent | | | |
| | Metal Complex | Lewis Acid Used [1] | Temp., °C. | Rate, Kg. C₃=/hr./g. of Ni or Co | Methyl- pentenes | 2,3-di- methyl- butenes | n-Hexenes | C₉ olefins |
|---|---|---|---|---|---|---|---|---|
| Run No.: | | | | | | | | |
| 1 | (TBP)₂NiCl₂ | Et₃Al₂Cl₃ | 0 | 200 | 59 | 37 | 2 | 2 |
| 2 | (TCHP)₂NiCl₂ | Et₃Al₂Cl₃ | 0 | 150 | 12 | 72 | 1 | 15 |
| 3 | (TCHP)₂NiBr₂ | Et₃Al₂Cl₃ | 0 | 150 | 13 | 71 | 1 | 15 |
| 4 | (T i-PP)₂NiCl₂ | Et₃Al₂Cl₃ | 0 | 200 | 10 | 72 | 1 | 17 |
| 5 | DPE NiCl₂ | Et₃Al₂Cl₃ | 0 | 120 | 79 | 9 | 6 | 6 |
| 6 [2] | (T i-PP)₂NiCl₂ | Et₂AlCl | 0 | 100 | 15 | 65 | 1 | 19 |
| 7 | (TBP)₂NiCl₂ | EtAlCl₂ | 0 | 100 | 68 | 28 | 2 | 2 |
| 8 | (TCHP)₂NiCl₂ | EtAlCl₂ | 0 | 80 | 32 | 66 | 1 | 1 |
| 9 | (TBP)₂CoCl₂ | EtAlCl₂ | 25 | 2 | 64 | 28 | 4 | 4 |
| 10 | (TCHP)₂CoCl₂ | EtAlCl₂ | 25 | 1 | 32 | 63 | 3 | 2 |
| 11 | ((RO)₃P)₂NiCl₂ | EtAlCl₂ | 25 | (³) | | | | |
| 12 | (TPP)₂PdCl₂ | EtAlCl₂ | 25 | (³) | | | | |

[1] Atomic ratio of Al:Me in all runs=20:1 (except Run No. 6 wherein Al:Ni=30:1.
[2] Solvent used in Run No. 6 was toluene; chlorobenzene used in all other runs.
[3] No reaction.

From the results of Table II it can be seen that each of the catalyst systems of Runs 1–10 was capable of dimerizing propylene and that the skeletal structure of the dimer product depends upon the kind of R group in the phosphine as herein previously discussed. The results show that the nickel catalysts are distinctly more active than the corresponding cobalt catalysts and that it is preferable to use an aluminum sesquihalide as the Lewis acid component. The importance of phosphine groups in making an active catalyst is indicated by comparing Runs 1–10 with Run 11 wherein the complex obtained by combining NiCl₂ with a trialkylphosphite is seen to result in total inoperability. Run 12 shows that a metal such as palladium cannot be substituted for nickel or cobalt to form an analogous catalyst system.

Run 13

A run was made which was a substantial duplication of Run 4 except that ethylene was substituted for propylene. The catalyst was a combination of (T i-PP)₂NiCl₂ and Et₃Al₂Cl₃ in the same proportion as in Run 4 and the reaction temperature was 0° C. The rate of reaction was found to be about 100 kg. of ethylene/hr./g. of Ni. The reaction product was composed of about 80% by weight of butene-1 in admixture with minor amounts of hexenes and octenes.

Run 14

Another run was made under substantially the same conditions and with the same catalyst as used in Runs 4 and 13, except that the olefin monomer was octene-1 which was added, after deaeration of the catalyst solution, in the form of a 50% solution composed of 30 ml. octene-1 and 30 ml. chlorobenzene. At the end of 6 hrs. reaction at 0° C., about 80% of the octene-1 had dimerized to C₁₆ olefins of various structures.

When other Lewis acids corresponding to R₃'Al₂X₃', R'AlX₂' or R₂'AlX' as herein defined are substituted for the Lewis acids used in the foregoing examples, substantially equivalent results are obtained. Also the use of phosphines having other R groups as herein specified similarly yields catalysts effective for purposes of the invention. Olefinic hydrocarbons other than those shown in the foregoing examples can be dimerized in analogous fashion by means of the present catalysts, provided that the olefin monomer has at least one double bond between carbon atoms neither of which has a side substituent.

I claim:

1. Process for perparing 2,3-dimethylbutenes by dimerizing propylene which comprises contacting propylene in the absence of diolefin at a temperature in the range of —100° C. to 200° C. with a catalyst system which is a combination of a coordination complex having any of the formulas

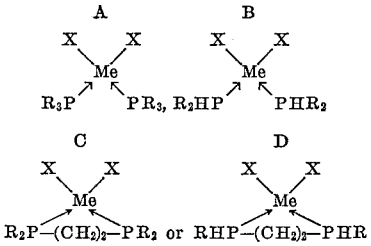

with a Lewis acid of the group R'AlX₂', R₃'Al₂X₃' and R₂'AlX', wherein Me is nickel(II) or cobalt(II), X is chlorine, bromine or iodine, X' is chlorine or bromine, R represents saturated hydrocarbyl radicals having 1–30 carbon atoms, R' represents hydrocarbyl radicals having 1–30 carbon atoms selected from the group consisting of alkyl, cycloalkyl, alkenyl, cycloalkenyl, aryl, aralkyl and aralkenyl, the atomic ratio of Al:Me in the system being in excess of 2:1, and recovering a hydrocarbon product containing at least 28% 2,3-dimethylbutenes.

2. Process in accordance with claim 1 wherein R represents saturated hydrocarbyl radicals each attached to the respective phosphorous atom through a secondary or tertiary carbon atom and wherein 2,3-dimethylbutenes constitute the main dimerization product.

3. Process in accordance with claim 2 wherein said temperature is in the range of —50° C. to 25° C.

4. Process in accordance with claim 3 wherein Me is nickel(II).

5. Process in accordance with claim 4 wherein the atomic ratio of Al:Ni is in the range of 10:1 to 100:1.

6. Process in accordance with claim 5 wherein said coordination complex has Formula A.

7. Process in accordance with claim 1 wherein Me is nickel(II).

8. Process in accordance with claim 7 wherein said coordination complex has Formula A.

9. Process in accordance with claim 8 wherein said Lewis acid is R₃'Al₂X₃'.

10. Process in accordance with claim 9 wherein X is chlorine or bromine.

11. Process in accordance with claim 7 wherein said temperature is in the range of —50° C. to 100° C., X is chlorine or bromine, and the atomic ratio of Al:Ni is in the range of 10:1 to 100:1.

12. Process in accordance with claim 11 wherein R represents saturated hydrocarbyl radicals each attached to the respective phosphorous atom through a secondary or tertiary carbon atom and wherein 2,3-dimethylbutenes constitute the main dimerization product.

13. Process in accordance with claim 12 wherein R is selected from isopropyl, t-butyl, cyclopentyl and cyclohexyl groups.

14. Process in accordance with claim 1 wherein propylene is contacted at −50° C. to 25° C. with a catalyst system in which said coordination complex has Formula A with Me being nickel(II) and with each R being a saturated hydrocarbyl radical attached to the phosphorous atom through a secondary or tertiary carbon atom, and in which the atomic raito of Al:Ni is in the range of 10:1 to 100:1, and wherein a hydrocarbon product is recovered in which 2,3-dimethylbutenes constitute the main dimerization product.

15. Process in accordance with claim 14 wherein said Lewis acid is an alkylaluminum sesquichloride or sesquibromide and wherein X is chlorine or bromine.

16. Process in accordance with claim 15 wherein R is selected from isopropyl, t-butyl, cyclopentyl and cyclohexyl groups.

References Cited

UNITED STATES PATENTS

| | | |
|---|---|---|
| 3,182,051 | 5/1965 | Marullo et al. |
| 3,306,948 | 2/1967 | Kealy. |
| 3,355,510 | 11/1967 | Cannell et al. |
| 3,390,201 | 6/1968 | Drew _____ 260—676 |
| 3,405,194 | 10/1968 | Iwamoto et al. |

PAUL M. COUGHLAN, JR., Primary Examiner

U.S. Cl. X.R.

252—429